(No Model.)

O. H. HUEBEL.
SWINGING RING.

No. 550,791. Patented Dec. 3, 1895.

Witnesses
Geo. Wadman
Anthony Ive

Inventor
Otto H. Huebel
By his attorney
Edwin H. Brown

United States Patent Office.

OTTO H. HUEBEL, OF BROOKLYN, ASSIGNOR TO WILLIAM BERNARD AND LEO FRANK, OF NEW YORK, N. Y.

SWINGING RING.

SPECIFICATION forming part of Letters Patent No. 550,791, dated December 3, 1895.

Application filed April 7, 1894. Serial No. 506,733. (No model.)

*To all whom it may concern:*

Be it known that I, OTTO H. HUEBEL, a citizen of the United States, residing in Brooklyn, in the county of Kings and State of New York, have invented certain new and useful Improvements in Swinging Rings, of which the following is a specification.

My improvement relates to swinging rings—such, for instance, as are used in a form of towel-holder now in common use.

The object of my improvement is to allow the rings to have greater freedom of movement than under the ordinary construction. I will describe my improvement in detail and point out the novel features in the claim.

Figure 1:
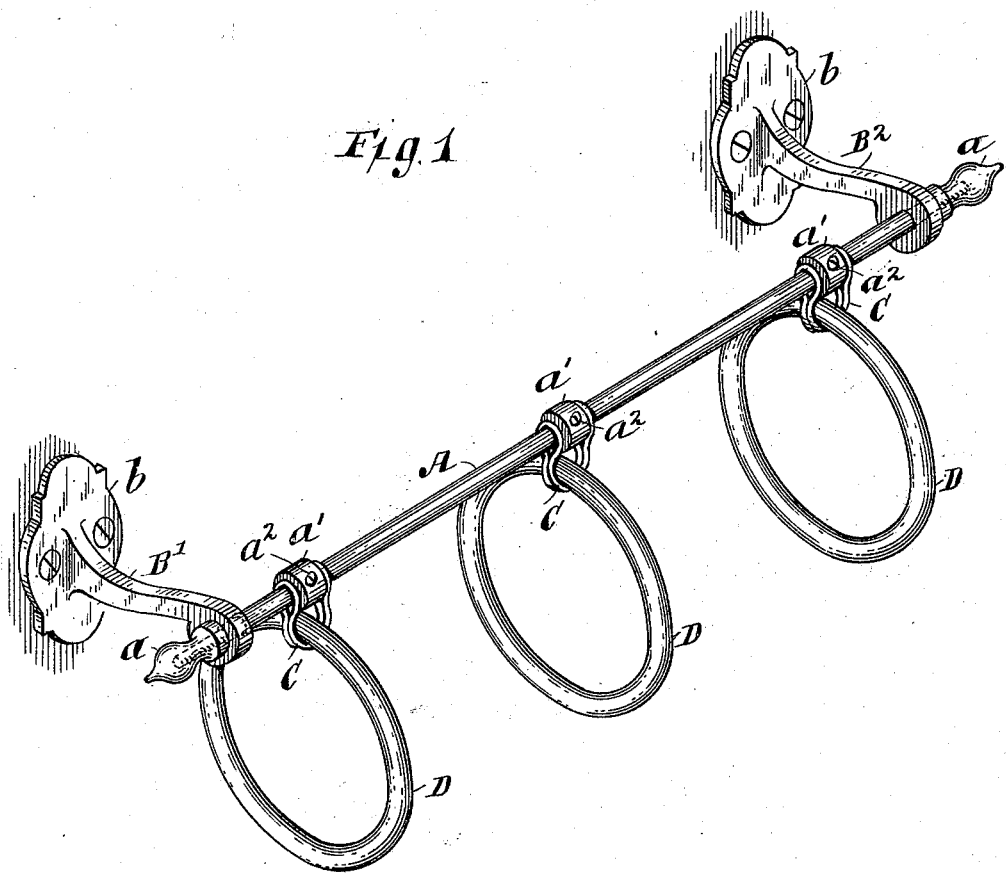
Figure 2:
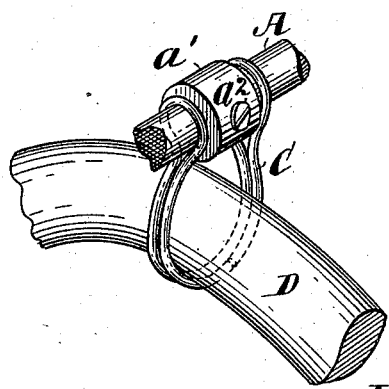

In the accompanying drawings, Figure 1 is a perspective view of a towel-holder embodying my improvement. Fig. 2 is an enlarged perspective view of a portion of a rod comprised therein, a portion of one of the rings, and the connections between the rod and ring.

Similar letters of reference designate corresponding parts.

A designates a rod, of any suitable material—such, for example, as metal—fitted at the ends to brackets $B'$ $B^2$, capable of being fastened to a wall or other support. As here shown, these brackets terminate at one end in plates $b$, which may be fastened by screws to a support, and at the other end are provided with holes constituting bearings, in which shouldered portions at the extremities of the rod A may fit, as indicated in dotted lines in Fig. 1. These terminal portions are screw-threaded, so that caps $a$ may be fastened to their ends outside of the brackets $B'$ $B^2$.

The rod A at intervals has fixed to it collars $a'$. These may be made of a size to fit the rod loosely and may be fastened in place by radially-extending set-screws $a^2$.

C designates hangers fastened to the rod and serving as supports for rings D, which constitute towel-holders.

The rings D may be made of wood and of round cross-section.

The hangers C are here shown to consist of wires doubled, so as to form main portions through which the rings may safely pass, and eye portions or loops which embrace the rod A at reverse sides of the collars $a'$. These collars prevent the hangers from sliding lengthwise of the rod A. As the rod is round or cylindrical and the eyes or loops of the hangers fits loosely upon it the hangers may swing about the rod as an axis. As the main portion of the hangers is made considerably larger than the cross-section of the rings the latter may run freely through the same circumferentially, and besides this the rings will be allowed to swing laterally. Great freedom of motion is thus afforded to the rings.

The packing of a towel-holder made as above described will be facilitated, because the rings will be able to swing flat against the rod and also to be bodily twisted over into the same plane as the brackets.

Of course modifications may be made without departing from the spirit of my improvements, which involve a swinging connection of rings with the hangers and a rotary or circumferential movement of the rings in the hangers when the latter motion is desired in addition to the others.

I do not wish to be confined to the use of the improvement in connection with towel-holders, as it is applicable to various other articles.

What I claim as my invention, and desire to secure by Letters Patent, is—

The combination of a rod or rod like support, a hanger having a main portion or loop depending vertically below the rod or rod like support and provided with independent eyes or loops at the extremities of the main portion or loop which embrace the rod or rod like support on all sides in a manner to permit of the rotation of the hanger bodily around its support, a collar affixed to the support to prevent lengthwise movement of the hanger, and a ring passing through the main portion or loop, and freely movable in all directions therein, substantially as specified.

In testimony whereof I have signed my name to this specification in the presence of two subscribing witnesses.

OTTO H. HUEBEL.

Witnesses:
 FREDERICK W. MAUGER,
 MICHAEL GRU.